United States Patent

Dymond et al.

[11] Patent Number: 5,886,443
[45] Date of Patent: Mar. 23, 1999

[54] SPARK SUPPRESSION OF INDUCTION TYPE ROTORS OF DYNAMOELECTRIC MACHINES

[75] Inventors: James Henry Dymond; Bernard John Moore; Robert Henry Rehder, all of Peterborough, Canada

[73] Assignee: General Electric Canada Inc., Mississauga, Canada

[21] Appl. No.: 984,620

[22] Filed: Dec. 3, 1997

[51] Int. Cl.[6] .................................................... H02K 1/00
[52] U.S. Cl. ......................... 310/196; 310/196; 310/220; 310/125
[58] Field of Search .................... 310/196, 220, 310/125

[56] References Cited

U.S. PATENT DOCUMENTS

| | | | |
|---|---|---|---|
| 3,466,477 | 9/1969 | Newill | 310/125 |
| 4,095,627 | 6/1978 | Lonseth et al. | 141/250 |
| 5,182,483 | 1/1993 | Hibino et al. | 310/211 |
| 5,389,844 | 2/1995 | Yarr et al. | 310/15 |

*Primary Examiner*—Thomas M. Dougherty
*Assistant Examiner*—Thanh Lam
*Attorney, Agent, or Firm*—Edward H Oldham

[57] ABSTRACT

A rotor for an induction motor of the squirrel cage type wherein the rotor bars are exposed to a resilient anti-sparking compound in the rotor slots of the machine. The rotor bars are provided with a longitudinal slot to permit the insertion of the anti-sparking compound after assembly of the squirrel cage rotor. Alternatively, the laminations may be shaped to produce a longitudinal groove in the rotor bar slot to permit the insertion of the anti-sparking compound in the groove so produced. Of course, both the rotor bar and the rotor slot may both be provided with complimentary slots adjacent one another in which the anti-sparking compound may be injected.

12 Claims, 4 Drawing Sheets

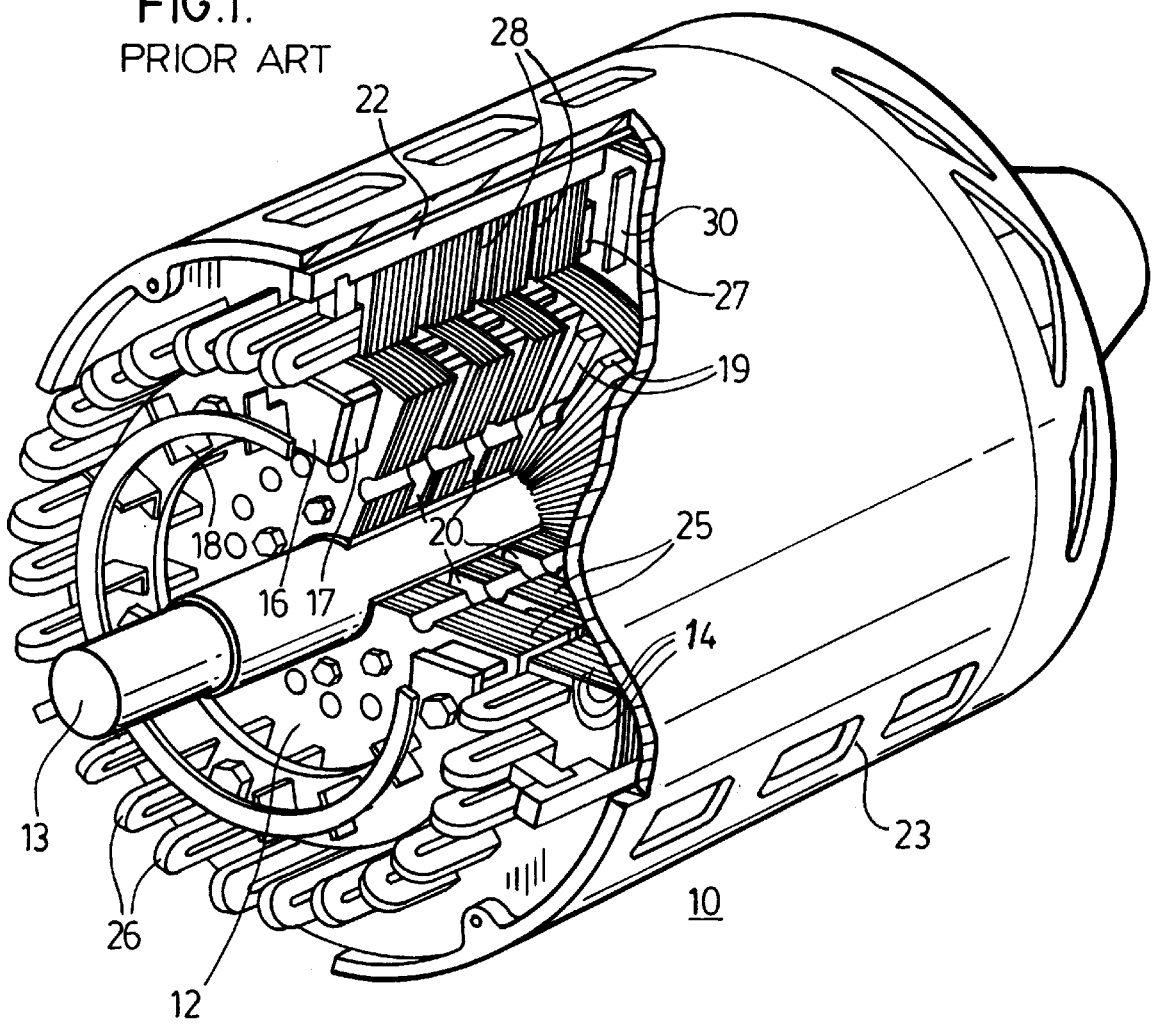

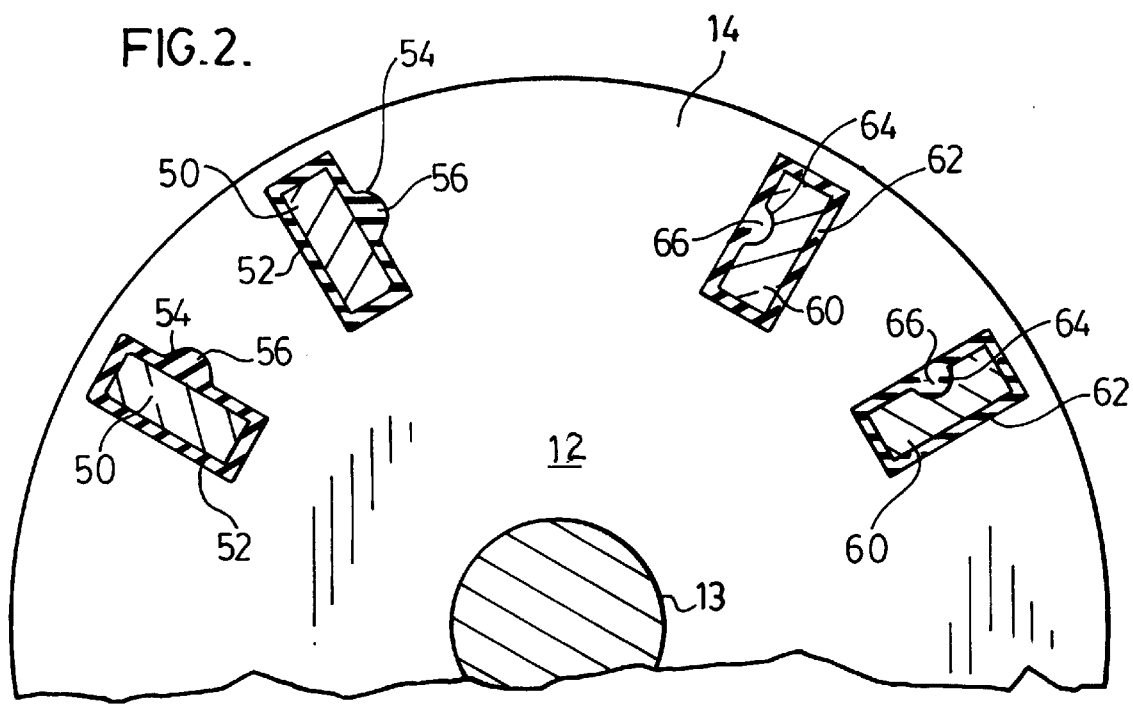
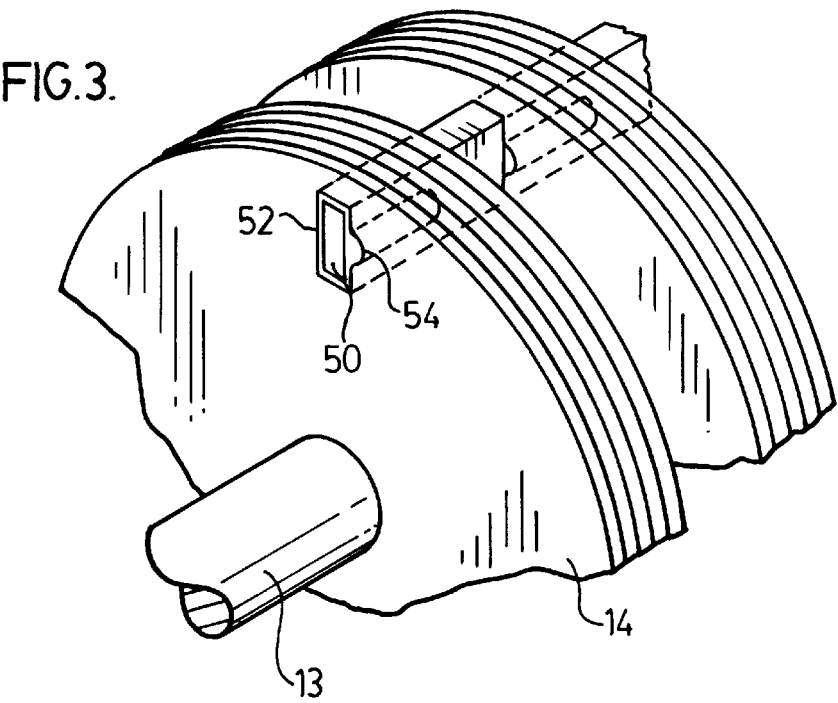

SPARK SUPPRESSION OF INDUCTION TYPE ROTORS OF DYNAMOELECTRIC MACHINES

BACKGROUND OF THE INVENTION

The standard multi-phase induction motor is one branch of the dynamoelectric machine (DEM) family which may be said to have reached a stage of mature development. Because of the nature of the induction motor and its underlying principle of operation, the basic designs of this type of dynamoelectric machinery tend to be relatively standard.

Usually the construction of an induction motor consists of a stator and rotor mounted within a frame work in such a manner that the rotor is free to rotate in a set of bearings mounted therein.

The stator is connected to a multiphase source of ac power to produce a rotating magnetic field which passes through the rotor. The rotor when subjected to the rotating magnetic field has a structure which produces an induced magnetic rotor field which results in a torque being produced in the rotor which causes rotation of the rotor.

The rotor of induction type dynamoelectric machines whether a standard ac induction motor or an induction start synchronous type ac machine utilizes a construction which follows a standard pattern. A magnetic core or other type of magnetic body formed of laminations of a magnetic material is securely mounted on a shaft or spider in such a manner as to ensure rotation therewith.

In the case of an induction motor, the rotor construction usually consists of a shaft on which packets of disc shaped laminations are mounted in such a manner as to produce a rotor core. Periodically ventilation ducts are produced in the rotor core by the insertion of suitable spacer devices between the lamination packets.

The laminations forming the rotor core are usually provided with axially extending slots at or near the periphery of the rotor for the insertion of rotor bars. In the construction of a fabricated rotor, rotor bars are driven into the rotor slots or recesses so that a portion of each rotor bar extends slightly beyond the ends of the rotor core. In the usual construction of an ac induction type rotor, a shorting ring (usually copper or an alloy thereof is brazed to the rotor bar ends protruding from each end of the rotor core. This construction is usually referred to as a "squirrel cage" rotor.

A similar construction is employed in amortisseur windings of synchronous ac dynamoelectric machines. Designers of this type of machine have for many years employed a "damper" or amortisseur winding to provide the necessary torque to start these machines (most synchronous machines embody a construction which produces zero torque at rotor standstill).

As a result a rotor construction is employed which basically utilizes a squirrel cage type operation within the synchronous rotor to produce the necessary starting torque for the synchronous machine. Rotor bars are driven through recesses provided near or at the surface of the pole faces of the rotor so that the ends of the rotor bars protrude slightly beyond the ends of the rotor poles. A pair of shorting rings are suitably connected (by brazing) to the ends of the rotor bars to permit the flow of current in the rotor bars to produce the resulting rotor magnetic field necessary to produce the rotor starting torque. Because of the maturity of the design of this type of machine, the rotor bars are usually aluminum or copper or alloys thereof, and in the case of an induction motor the rotor usually takes the form of a cylinder.

Although the rotors of synchronous machines take other shapes depending on whether the poles are salient or not, the principles of squirrel cage operation are equally applicable to this type of machine and although this application will generally describe ac induction type motors, the techniques employed to overcome the problems of prior art induction type dynamoelectric motors are equally applicable to dynamoelectric machines of the synchronous type wherein an amortisseur winding is employed to produce starting torque.

The operation of a squirrel cage is fairly well understood and at stand still the operation of the squirrel cage motor may be loosely compared to a transformer. The stator in which the squirrel cage rotor rotates produces a rotating magnetic field which produces an induced electromotive force (EMF), in the stationary rotor which causes circulating currents to flow in the rotor bars of the rotor. At stand still, the frequency of the induced EMF in the rotor bars is equal to the frequency of the electrical supply to the stator windings of the motor. It is in this stage (i.e. locked rotor) that very large circulating currents pass through the rotor bars and shorting rings. The circulating currents will decrease as the rotor speed increases but the currents continue to be large in magnitude as long as the rotor is producing maximum torque. During this period rotor bar currents flow in such a manner that maximum current density occurs at the top of the rotor bars. As the rotor speed increases, the frequency of the induced rotor currents decreases and the current distribution in the rotor bars becomes more uniform.

Under certain conditions which are not completely understood, sparking occurs in squirrel cage rotors of induction motors embodying this type of rotor. Considerable study has been directed to the determination of the cause of the generation of sparks in the rotor of squirrel cage induction machines and one school of thought postulates that although rotor bars are thought to be contacted by each lamination forming the slot surrounding the rotor bar, such contact between rotor bar and successive laminations may not be perfect. As a result, small gaps between the rotor bar and surrounding laminations may exist where several successive rotor laminations may not make a good electrical contact with that particular portion of a rotor bar. It is believed that at these gaps, a sufficient EMF may be built up to cause a spark to occur across the gap even though the rotor bars effectively function as a short circuit. Another theory is the rotor bars have a limited amount of freedom to move and vibrate in the clearance provided in the slot causing a "make and break" contact between the punchings and the rotor bars as the bars move. It is during these conditions when the frequency of the induced EMF in the rotor is highest (i.e. locked rotor) that sparking seems to occur in the rotor.

It is to overcome the occurrence of sparking in squirrel cage rotors of induction motors that this application is primarily directed. However, the technique to be described is equally applicable to the amortisseur windings of synchronous DEM's to prevent amortisseur sparking during operation.

SUMMARY OF THE INVENTION

In order to provide continuous spark suppression in the rotor of dynamoelectric machine, it has been found that compounds such as room temperature vulcanizing (RTV) silicone, when loaded with conducting particles of materials such as carbon particles or a RTV silicone loaded with semi-conducting particles such as silicon carbide, zinc oxide or other similar materials will provide excellent protection against the generation of sparks in the rotor. It is imperative that the compound carrying the conductive or semi-conductive particles remain elastic and flexible over the life of the machine. The RTV silicones are ideally suited for this purpose. These materials readily bond with the rotor bars and the surrounding magnetic laminations and because of their unique ability to retain these physical properties during the usual thermal cycling which necessarily occurs in the rotor during normal operations, these materials continue to stay bonded to the rotor bars and laminations to provide uninterrupted protection against rotor sparking.

These flexible RTV loaded silicones are particularly effective in eliminating the make and break type of sparking related to the rotor bar vibration mentioned previously. The loaded RTV material readily fills any air gaps existing between the rotor bars and the surrounding laminations. This prevents air breakdown and electrical discharge.

It is well known that it is the current flow through the rotor bars that produces the output torque in these machines. Any current flow between adjacent rotor bars which flows through the magnetic laminations reduces the output torque and increases the "stray load loss". The semi-conducting particles in the RTV materials are particularly effective in reducing current flow through the magnetic laminations because of their unique electrical properties and thus their presence in the RTV silicone helps minimize "stray load loss" and assist in maintaining the torque rating of the machine over its lifetime.

PRIOR ART

Some attempt has been made in the past by some machine manufacturers to eliminate rotor sparking by insulating the rotor bars from the surrounding rotor laminations. To accomplish this, a layer of insulation has been applied to the surface of the rotor bars, typically a mica or ceramic material. Of course, this technique can only be applied to rotors which are of the fabricated type i.e. in the situation in which the rotor bars are installed in the rotor by insertion into the rotor slots provided in the stacked rotor laminations.

Not only are these techniques time consuming and expensive, but the insulating medium (mica or ceramic) is subject to abrasions caused by the occasional proud rotor punching which may protrude into the rotor slot (due to improper lamination punching or misaligned laminations during stacking) resulting in insulation removal or depreciation. Any subsequent movement of the rotor bar in the rotor slot during the life of the machine will tend to further abrade the rotor bar insulation at the point of lamination intrusion. The remainder of the rotor bar nevertheless remains perfectly insulated until another intrusive lamination is encountered by the rotor bar. The shorting distance between the "intrusive laminations" may be considerably longer than would be the case had the rotor bars not been insulated. A substantially larger potential may now be developed between the two intrusive laminations which are contacting to the bar so that any vibration of the rotor bar may produce a "make or break" condition that yields rotor sparking.

Another method involves the application of an epoxy resin between the bars and the laminations forming the rotor slots. Alternately bars have been peened to increase the contact between the laminations and the rotor bars. Another method of improving the rotor bar-lamination interface utilizes wedges to keep the rotor bars tight in the rotor slots. Because of the thermal cycling which occurs in the rotor during its operation, the rotor bars must experience thermal growth and subsequent contraction during the thermal cycles. Epoxy resins are usually hard and may become somewhat embrittled during repeated thermal cycling. In the end, the epoxy resins tend to crack and fall out of the interstices existing between the bars and slots allowing the rotor bars to vibrate in the rotor slots. Similarly, peening the bars seems to be effective for a fairly short time before the thermal growth of the rotor bars limits the effectiveness of the rotor bar-lamination contact produced by peening. Wedging of the rotor bars will prevent the vibration of the rotor bars in the slots until the continued thermal cycling causes the wedges to loosen in the slots so that the rotor bars are free to vibrate in their respective slots to produce the unwanted sparking of the rotor.

BRIEF DESCRIPTION OF DRAWINGS

FIG. 1 is a partial section perspective view of a dynamo-electric machine (DEM) squirrel cage rotor;

FIG. 2 is an enlarged partial sectional view of the rotor of FIG. 1 showing various embodiments of the invention;

FIG. 3 is a cross-sectional view of a portion of the rotor of FIG. 2;

DESCRIPTION OF THE PREFERRED EMBODIMENT

Figure 4:
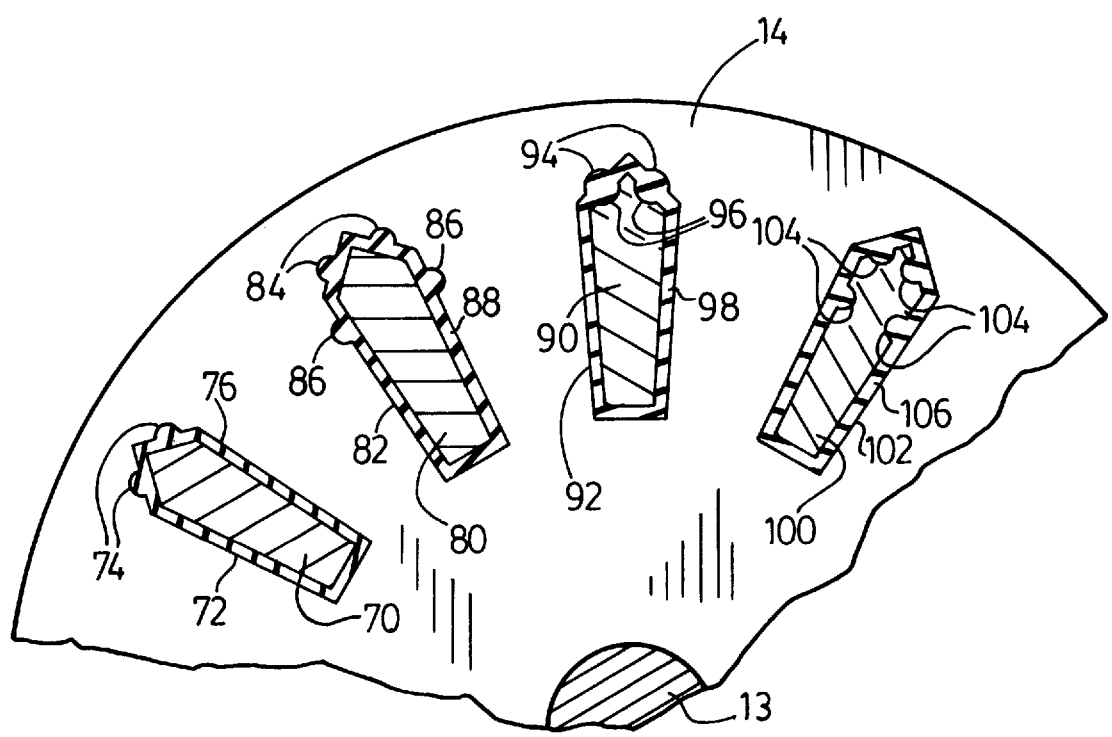
FIG. 4 is a cross section view of a rotor section showing how the invention may be applied to differently shaped rotor bars.

Referring now to the drawings where like reference characters designate like or corresponding parts throughout several views, there is shown in FIG. 1 a dynamoelectric machine (DEM) 10 comprising a rotor 12 including a shaft 13 supporting laminations 14 having a bar winding in slots (not shown) disposed therein. End rings 16 integrally connected with the bar conductors 17 of the winding are positioned on opposite ends of the rotor and have fan blades 18 mounted thereon in the usual manner. Since the rotor illustrated is of a conventional squirrel cage design, the bar conductors forming the winding are not exposed where the rotor bars pass through laminations 14 because the slots are closed to the rotor surface (in this particular type of construction). As shown, a multitude of air ducts 20 are opened to the rotor surface and are formed during the manufacturing operation by locating space blocks 19 between sections of laminations along the length of the rotor in a manner well known in the art. The axial bar conductors of the winding bridge the air ducts formed by space blocks between the lamination sections.

The stator 22 is positioned in frame 23 of conventional construction and includes laminations 14 assembled in sections 25 to form the stator core. Coil conductors 26 are disposed in slots 27 therein in the usual manner all of the coils thus comprising the winding for the stator. Each section 25 is spaced from the next section by space blocks 30 brazed or otherwise secured to the flat surface of one of the laminations 24. Space blocks 30 thus form air ducts 28 in the stator 22.

Rotor bars 17 are located in slots in laminations 14 in the usual manner. The bars 17 may be aluminum or copper or alloys thereof. The rotor slots may open into the airgap on certain machines, or the rotor bar 17 may be completely surrounded by the slot formed in laminations 14 as shown in FIG. 1. It is usual to allow for some freedom of movement of the rotor bars 17 in the slots formed in the laminations to allow for the difference in expansion rates of the materials comprising the rotor bars and the magnetic laminations in the rotor and to allow for the insertion of the rotor bars into the slots during manufacture.

Referring now to FIG. 2 which illustrates a cross-sectional view of a squirrel cage rotor 12 of the present invention, it will be seen that shaft 13 passes through laminations 14 in which ultimately carry the rotor bars. In one embodiment slots 52 are provided to capture rotor bars 50. Slots 52 have been provided with a somewhat semi-circular recess 54 in each of the laminations 14 to provide a groove which passes through the lamination packets adjacent each rotor bar 50. A suitable compound 56 is shown filling the space between the rotor bars 50 and slots 52 including recesses 54.

Also illustrated in FIG. 2 is a set of rotor bars 60 held captive in slots 62 in laminations 14. In this instance, a groove 64 is provided in rotor bars 60 to allow a suitable compound 66 to be introduced into the space between the slots 62 in the lamination packets and the rotor bars 60.

FIG. 3 shows a partial sectional perspective of the rotor construction for rotor bars 50 in slots 52. Note the presence of groove 54 in the laminations 14.

FIG. 4 shows how the invention may be applied to rotor bars having a trapezoidal cross-section in various groove configurations. Here rotor bars 70, 80, 90 and 100 are captivated by slots 72, 82, 92 and 102 respectively.

Slot 72 is provided with a pair of grooved recesses 74 in laminations 14. Slot 82 is provided with a similar pair of grooved recesses 84 at the top of slot 82 and in addition a second pair of grooved recesses 86 are formed radially inwardly of the top grooved recesses.

Slot 92 is provided with a pair of grooved recesses 94 in the top portions of the slot 92, and additionally bar 90 is provided with a pair of complimentary grooves 96 in juxtaposition with grooves 94.

Bar 100 is provided with four similar grooves 104 in the surface thereof as shown.

The space between the rotor bars 70, 80, 90, 100 and the slots 72, 82, 92 and 102 respectively is filled with an anti-sparking compound which will remain elastic during the life of the DEM. The preferred anti-sparking compound is a conductive room temperature vulcanizing (CRTV) silicone. Such compounds are commercially from a number of sources.

Other compounds which will successfully function as suitable slot bar interface fillers are room temperature vulcanizing (RTV) silicone loaded with particles of a semi-conducting compound such as silicon carbide. The particle size should be about 40 microns. Of course other compounds will be obvious to those skilled in the art; it is important that the RTV material remain elastic over the life of the machine.

FIG. 3 shows that the above anti-sparking compounds occupy the space provided by groove 54 in the lamination-rotor bar interface. Some of the compound may escape from the groove 54 where the laminations 14 are slightly spaced from the bars 50. The compound may be injected into the grooves provided in rotor bars or rotor lamination, at the ends of the rotor and also each air duct 20 provides access to the rotor ducts such as 54.

It is important that the grooves such as 54 and any interstices existing between the rotor bars and the rotor slots are filled with the loaded RTV material and it is important that ventilation ducts such as ducts 20 as shown in FIG. 1 remain unobstructed.

It will be found that it may not be necessary to apply the loaded RTV silicone to the complete recesses such as 54 as they extend the entire length of the rotor; usually the loaded compound may be injected into the recesses such as 54 of the most exterior lamination packets. It has been found that most rotors which are susceptible to sparking, produce the sparking phenomena at the outermost lamination packets of the rotor. For this reasons if the anti-sparking compound is applied to the rotor slot-bar interface in the first two or three packets at the rotor extremities, sparking will be eliminated.

Figure 5:
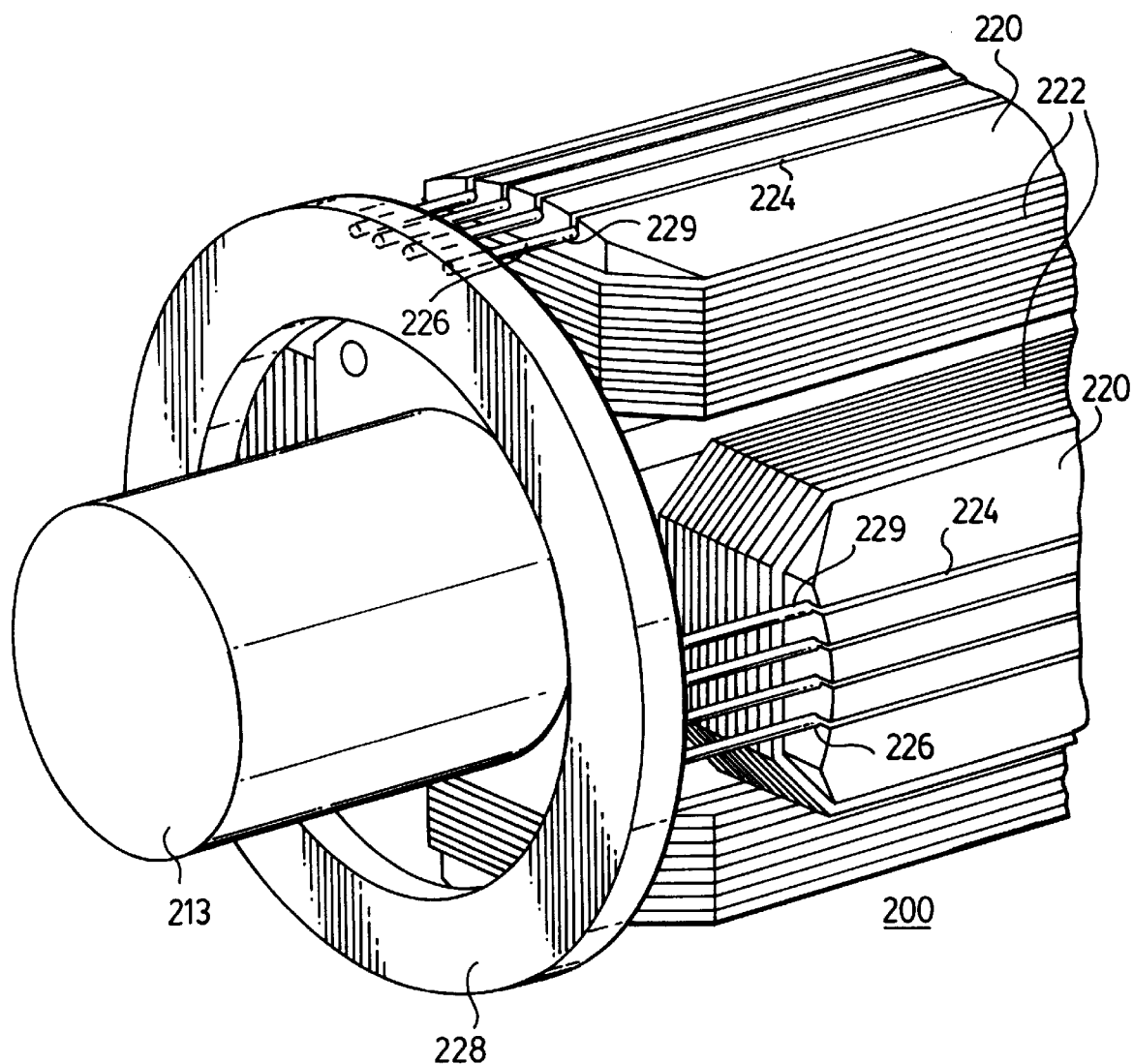
FIG. 5 is a partial perspective of the rotor of a salient pole synchronous machine showing an amortisseur winding.

FIG. 5 shows a rotor 200 of a salient pole synchronous machine. Rotor 200 is shown having a shaft 213 on which salient poles 220 are mounted. Poles 220 are supplied with windings 222 which are wound around poles 220 in the usual manner. A series of amortisseur bars 226 are inserted in recesses 229 in the pole tips of poles 220. Slots 224 join recesses 229 to the surface of the pole tips. Amortisseur bars 226 are brazed to shorting ring 228 to permit the required induced currents to flow in amortisseur bars during start up. The magnetic field produced in the rotor 200 is exactly the same as for an induction motor described previously. Sparking of amortisseur bars may occur and this invention is equally applicable to the prevention of sparking in the recesses 229 as it is in induction motor squirrel cage rotor slots.

Although only a few compounds and semi-conducting filler materials have been set out here, other compounds and semi-conducting materials will be obvious to those skilled in the art. Applicant wishes to limit the protection of this invention by the scope of the following claims.

We claim:

1. A rotor for an ac induction type machine comprising:

a shaft having a magnetic structure mounted thereon for receiving a set of conductive bars therein;

said magnetic structure having a shape to fit into an ac induction type stator;

said conductive bars being mounted in suitable rotor slots in said magnetic structure at predetermined locations therein;

each conductive bar having the ends of which protrude slightly beyond said magnetic structure;

said rotor also having a pair of shorting rings integrally attached to said conductive bars at the ends thereof;

each conductive bar and rotor slot having a recess provided therein which extends between the conductive bar and the rotor slot at least partially through said magnetic structure said recess containing a preselected anti-sparking compound.

2. A rotor as claimed in claim 1 wherein said recess comprises at least one groove in each rotor slot.

3. A rotor as claimed in claim 1 wherein said recess comprises at least one groove which extends axially along each conductive bar.

4. A rotor as claimed in claim 1 wherein said recess comprises at least one groove in the rotor slot as well as at least one groove which extends axially along each conductive bar.

5. A rotor as claimed in claim 1 wherein any grooves in said slot is accompanied by a corresponding groove in each rotor bar in a juxtaposed relationship thereto.

6. A rotor as claimed in claim 1 wherein said anti-sparking compound is an RTV silicone loaded with particles of carbon (CRTV) or with particles of silicon carbide or zinc oxide.

7. A rotor for a squirrel cage induction machine comprising:

a rotor core mounted on a shaft for rotation therewith;

said core carrying a plurality of axially extending rotor bars located in slots of lamination packets forming said core, said lamination packets having annular duct spaces formed therein between said lamination packets for the passage of ventilation air thereth rough, and a pair of shorting rings integrally attached to the ends of each rotor bar at each end of said rotor core, each bar and slot forming a recess therebetween in a predetermined number of lamination packets located at each end of said rotor, each recess so formed being filled with a preselected anti-sparking compound.

8. A rotor as claimed in claim 7 wherein each recess so formed extends axially of each rotor bar and slot and is filled with a CRTV silicone.

9. A rotor as claimed in claim 7 wherein each recess so formed extends in an axial direction and is filled with a RTV silicone loaded with particles of silicon carbide.

10. A method of making an anti-sparking rotor for an induction type DEM comprising:

providing a shaft, stacking a plurality of rotor core packets and interspersed space blocks together to form a cylindrically shaped rotor core, mounting the core so formed on said shaft for rotation therewith, providing longitudinally extending rotor bar slots at predetermined spaced intervals in said rotor core, providing rotor bars in said rotor slots so that the ends of the rotor bars protrude slightly beyond the ends of said cylindrically shaped core providing a pair of annular shaped shorting rings for said rotor attaching said bar ends to said shorting rings at the ends of said rotor providing a recess between each bar and rotor slot in a preselected number of rotor core packets introducing a preselected anti-sparking compound into each recess so formed in said rotor.

11. A rotor for a synchronous DEM comprising a shaft, a plurality of poles formed by a magnetic structure mounted on said shaft for rotation therewith, each pole having a winding surrounding said pole, each pole having a curved outer surface forming a pole face, each pole carrying at least one conductive bar in at least one slot formed in said pole slightly below said pole face, each bar have its ends protrude slightly beyond said magnetic structure, shorting rings located at either end of said magnetic structure integrally connected to said ends of conductive bars, a recess formed in each slot carrying a conductive bar between said bar and said slot, each recess so formed having a preselected anti-sparking compound inserted therein.

12. A rotor as claimed in claim 11 wherein said anti-sparking compound is an RTV silicone loaded with particles of carbon, silicon carbide or zinc oxide.

* * * * *